US007738438B2

United States Patent
Mori et al.

(10) Patent No.: US 7,738,438 B2
(45) Date of Patent: Jun. 15, 2010

(54) RADIO BASE SYSTEM, CHANNEL ALLOCATION METHOD AND CHANNEL ALLOCATING PROGRAM

(75) Inventors: Koichi Mori, Anpachi-gun (JP); Seigo Nakao, Gifu (JP); Takeo Miyata, Anpachi-gun (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 1818 days.

(21) Appl. No.: 10/466,766

(22) PCT Filed: Jan. 21, 2002

(86) PCT No.: PCT/JP02/00396

§ 371 (c)(1),
(2), (4) Date: Jul. 31, 2003

(87) PCT Pub. No.: WO02/062095

PCT Pub. Date: Aug. 8, 2002

(65) Prior Publication Data

US 2004/0072560 A1 Apr. 15, 2004

(30) Foreign Application Priority Data

Jan. 31, 2001 (JP) .............................. 2001-023371

(51) Int. Cl.
*H04B 1/00* (2006.01)
(52) U.S. Cl. ....................... 370/345; 370/329; 370/437; 455/450; 455/452.1
(58) Field of Classification Search .............. 455/452.1, 455/452.2, 450, 561, 462.1, 63.1, 63.4; 370/345, 370/333, 337, 344, 329, 330, 442, 328, 319, 370/437
See application file for complete search history.

(56) References Cited

U.S. PATENT DOCUMENTS 5,096,924 A * 3/1992 Ishizuka et al. .............. 514/456

(Continued)

FOREIGN PATENT DOCUMENTS

EP 1041839 A2 10/2000

(Continued)

OTHER PUBLICATIONS

H. Suzuki et al.; "Path Division Multiple Access (PDMA) Mobile Radio Communication Systems"; *The Institute of Electronics, Information and Communication Engineers*; RCS93-84; pp. 37-44; Jan. 1994./Discussed in the specification.

(Continued)

*Primary Examiner*—George Eng
*Assistant Examiner*—Brandon J Miller
(74) *Attorney, Agent, or Firm*—Westerman, Hattori, Daniels & Adrian, LLP

(57) ABSTRACT

A radio base system (1000) is multi-path-connected to a plurality of mobile terminal devices to transmit/receive signals. When a communication channel establishment request is sent from one of the plurality of mobile terminal devices, a control unit (80) detects the presence or absence of a mobile terminal device to which a communication channel is already connected for each of a plurality of slots. When channel allocation has to be performed by path multiplexing on the mobile terminal device which has sent the channel establishment request, control unit (80) permits channel establishment in accordance with a result of detection of an error detecting unit (56).

10 Claims, 6 Drawing Sheets

U.S. PATENT DOCUMENTS

| | | | |
|---|---|---|---|
| 5,719,859 A * | 2/1998 | Kobayashi et al. | 370/347 |
| 5,930,248 A * | 7/1999 | Langlet et al. | 370/347 |
| 5,956,642 A * | 9/1999 | Larsson et al. | 455/449 |
| 6,356,556 B1 * | 3/2002 | Toth et al. | 370/442 |
| 6,456,610 B1 * | 9/2002 | Briley | 370/337 |
| 6,466,557 B1 * | 10/2002 | Doi | 370/332 |
| 6,496,142 B1 * | 12/2002 | Iinuma | 342/368 |
| 6,594,485 B1 * | 7/2003 | Ezaki | 455/417 |
| 6,744,746 B1 * | 6/2004 | Bartelme | 370/329 |
| 6,748,220 B1 * | 6/2004 | Chow et al. | 455/450 |
| 6,937,558 B2 * | 8/2005 | Wakutsu | 370/208 |
| 6,967,936 B1 * | 11/2005 | Laroia et al. | 370/329 |
| 7,031,368 B1 * | 4/2006 | Maruta et al. | 375/130 |
| 7,075,909 B1 * | 7/2006 | Iinuma | 370/329 |
| 7,110,793 B1 * | 9/2006 | Ishida | 455/562.1 |
| 7,177,346 B1 * | 2/2007 | Doi | 375/148 |
| 2001/0043578 A1 * | 11/2001 | Kumar et al. | 370/331 |
| 2002/0052204 A1 * | 5/2002 | Bender et al. | 455/450 |
| 2003/0069047 A1 * | 4/2003 | Kitahara | 455/562 |
| 2004/0005897 A1 * | 1/2004 | Tomoe et al. | 455/450 |

FOREIGN PATENT DOCUMENTS

JP     2000-278740     10/2000

OTHER PUBLICATIONS

T. Nishimura et al.; "A Study on reference signal synchronization for PHS/SDMA system"; *The Institute of Electronics, Information and Communication Engineers*; RCS99-35; pp. 61-66; Jun. 24, 1999./ Cited in the International Search Report.

D. Tanaka et al.; "A Criterion of Channel Allocation for 3-user SDMA with an Adaptive Array"; *The Institute of Electronics, Information and Communication Engineers*; RCS98-117; pp. 103-108; Oct. 22, 1998./Cited in the International Search Report.

G. Tsoulos et al.; "Wireless Personal Communications for the 21$^{st}$ Century: European Technological Advances in Adaptive Antennas"; *IEEE Communications Magazine*; vol. 35; Issue 9; pp. 102-109; Sep. 1997./Cited in the International Search Report.

* cited by examiner

RADIO BASE SYSTEM, CHANNEL ALLOCATION METHOD AND CHANNEL ALLOCATING PROGRAM

TECHNICAL FIELD

The present invention relates to a radio base system and a channel allocating method and, more particularly, to a radio base system in which a plurality of mobile terminal devices can be multi-path connected in a mobile communication system and a method and program for allocating a channel in response to a channel allocation request from the mobile terminal device in such a radio base system.

BACKGROUND ART

In recent years, in a mobile communication system (such as a Personal Handyphone System: hereinafter abbreviated as PHS) which is being rapidly developed, to efficiency of utilization of frequencies of radio waves, PDMA (Path Division Multiple Access) in which, by spatially dividing the same time slot of the same frequency, mobile terminal devices of a plurality of users can be multi-path connected to a radio base system has been proposed.

FIG. 6 is a channel allocation diagram in various communication systems of frequency division multiple access (FDMA), time division multiple access (TDMA) and path division multiple access (PDMA).

Referring to FIG. 6, FDMA, TDMA and PDMA will be briefly described. FIG. 6(a) shows the FDMA. Analog signals of users 1 to 4 are frequency-divided and transmitted on radio waves of different frequencies f1 to f4 and signals of users 1 to 4 are split by frequency filters.

In the TDMA shown in FIG. 6(b), digitized signals of respective users are split by time-division on a predetermined time (time slot) unit basis and sent over radio waves of different frequencies f1 to f4 and, signals of respective user are split by a frequency filter and time synchronization among a base station and mobile terminal devices of the users.

In contrast, in the PDMA method, as shown in FIG. 6(c), one time slot of the same frequency is also spatially divided to transmit data of a plurality of users. The number of path-multiplexing and the number of time-division multiplexing shown in FIG. 6(c) are illustrative. According to the configuration of a system, the values are changed.

Specifically, the PDMA (Path Division Multiple Access) method is a method of generating a directivity pattern for each of a plurality of mobile terminal devices in different directions by using an adaptive array device having directivity for both transmission and reception, thereby performing multiplexing communication by sharing carrier waves of one frequency at the same time.

The adaptive array device is constructed by a plurality of antennas fixedly mounted and has a feature in that directivity of the plurality of antennas as a whole is created by adjusting the amplitude and the phase of a transmission/reception signal of each of the antennas.

A radio base station for connecting a plurality of mobile terminal devices by path multiplexing are constructed by using adaptive array devices. The radio base station calculates a weight factor as an adjusting amount of the amplitude and phase with respect to a reception signal per antenna with respect to each mobile terminal device in order to split signals of the mobile stations from the reception signals on which communications of the plurality of mobile terminal devices are multiplexed.

The radio base station compares a signal obtained by multiplexing a reception signal of each antenna with a weight factor of the corresponding antenna and adding the resultant values with a reference signal and adjusts the weight factor so as to minimize the difference between the resultant signal and the reference signal. As the reference signal (unique word signal: UW signal), signal waveform data corresponding to a known fixed bit pattern included in a signal of a control channel or traffic channel is used.

By repeating the adjustment, the radio base station calculates a weight factor for each antenna with respect to each mobile terminal device as an object of path multiplexing, multiples a reception signal of each antenna on which signals of a plurality of mobile stations are multiplexed with the weight factor, and adding the resultant values, thereby separating the signal of each mobile station. At the time of transmission, a signal obtained by multiplying a transmission signal with a weight factor calculated at the time of reception on the antenna unit basis is sent from each antenna, thereby generating a directivity pattern in the mobile terminal device direction.

The path multiplexing technique is written in "Path Division Multiple Access (PDMA) Mobile Communication Method" (IEICE Technical Report RCS93-84 (1994-01), pp 37-44).

A radio base station determines whether communication by path multiplexing is proper or not with respect to a mobile terminal device which is already performing communication and another mobile terminal device newly requesting allocation of a communication channel as follows.

The radio base station calculates response vectors of the two mobile terminal devices as described above, and calculates a correlation value between the calculated two response vectors. The response vector is information regarding the direction in which a mobile station exists, and the correlation value of response vectors is an index indicating closeness of the directions of the two mobile stations.

When the calculated correlation value is larger than the threshold value, the two mobile stations exist almost in the same direction, so that it is impossible to separate the signals of the mobile stations from each other on the basis of the difference between the directivity patterns. In this case, the radio base station determines that multiplexing is improper between them.

The radio base station measures field intensities of signals from the two mobile terminal devices and calculates the ratio between the measured two field intensities. When the calculated field intensity ratio is larger than the threshold value, even when a best directivity pattern is formed, the intensity ratio between the signals is higher than a gain ratio of an adaptive array device. Consequently, it is determined that the signals cannot be properly separated from each other. In this case, the radio base station determines that path multiplexing is improper for them.

When there is no available time slots used for time-division multiplexing communication at the time of allocating a communication channel to a new mobile terminal device, the radio base station for connecting a plurality of mobile terminal devices by also using the time-division multiplexing method makes determination of whether the path multiplexing is proper or not on the time slot unit basis. In a time slot which is not used by a mobile station determined improper to be subjected to path multiplexing with a new mobile station, a communication channel is allocated by path multiplexing.

In such a manner, the radio base station performs path multiplexing only on a set of mobile terminal devices adapted to path multiplexing communication. Further, during the path multiplexing, the directivity pattern of the adaptive array device is made follow the direction in which each mobile terminal device exists, thereby preventing interference and maintaining proper communication quality.

According to the above-described method, at the time of allocating a communication channel to a new mobile station by path multiplexing, the radio base station determines whether the path multiplexing is proper or not by comparing the correlation value of response vectors of a new mobile terminal device and a mobile terminal device already performing communication or the ratio between field intensity of a signal received from a new mobile terminal device and field intensity ratio of a signal received from a mobile terminal device already performing communication with a corresponding threshold value. For the method of determining whether path multiplexing is proper or not, a threshold of DDR (intensity ratio of desired waves from two users), the difference value of reception timings, or the like can be also used.

However, in the case where a reception error generates in a user already performing communication in a slot on which multiplexing is newly performed, it is expected that sufficient precision of a weight vector generated in an adaptive array process of a radio base cannot be obtained. Therefore, in the case where directivity control of the adaptive array is not sufficient in such a state, interference removing capability deteriorates and, as a result, a gain necessary for multiple communication cannot be obtained. It causes a problem such that the characteristics of a down-link communication from the base station deteriorate.

The present invention has been achieved to solve the problems and an object thereof is to provide a radio base station system, a channel allocating method and a channel allocation program capable of assuring predetermined communication quality between a radio base station and a mobile terminal device by improving precision of determining whether path multiplexing is proper or not.

DISCLOSURE OF THE INVENTION

According to the present invention, a radio base system multi-path connected to a plurality of mobile terminal devices via a plurality of paths, each of which is multiplexed to a plurality of slots in a time division manner, to transmit/receive signals, includes: signal adjusting means for performing an adaptive array process for performing multi-path connection to the plurality of mobile terminal devices; error detecting means for detecting an error in a signal from the mobile terminal device connected to each of the plurality of slots; and control means, when a communication channel establishment request is sent from one of the plurality of mobile terminal devices, for detecting the presence or absence of a mobile terminal device to which a communication channel is already connected for each of the plurality of slots and, when a channel has to be allocated to the one mobile terminal device by path-multiplexing, for permitting channel establishment in accordance with a result of detection of the error detecting means.

Preferably, the signal includes a code for error detection, and the error detecting means detects an error in the signal on the basis of the error detection code.

Preferably, the signal includes a reference signal used by the signal adjusting means to perform the adaptive array process, and the error detecting means detects an error in the signal on the basis of a detection error of the reference signal.

More preferably, the signal includes a plurality of frames each having a predetermined number of the slots, and the error detecting means detects an error in the signal on the basis of the number of errors based on the error detection code per the frame.

According to another aspect of the present invention, a channel allocating method in a radio base system multi-path connected to a plurality of mobile terminal devices via a plurality of paths, each of which is multiplexed to a plurality of slots in a time division manner, to transmit/receive signals, includes the steps of: detecting an error in a signal from the mobile terminal device connected to each of the plurality of slots; detecting, when a communication channel establishment request is sent from one of the plurality of mobile terminal devices, the presence or absence of a mobile terminal device to which a communication channel is already connected for each of the plurality of slots; and permitting, when a channel has to be allocated to the one mobile terminal device by path-multiplexing, channel establishment in accordance with the detected error.

According to still another aspect of the present invention, there is provided a program for a computer for allocating a channel in a radio base system multi-path connected to a plurality of mobile terminal devices via a plurality of paths, each of which is multiplexed to a plurality of slots in a time division manner, to transmit/receive signals. The program causes the computer to execute the steps of: detecting an error in a signal from the mobile terminal device connected to each of the plurality of slots; detecting, when a communication channel establishment request is sent from one of the plurality of mobile terminal devices, the presence or absence of a mobile terminal device to which a communication channel is already connected for each of the plurality of slots; and permitting, when a channel has to be allocated to the one mobile terminal device by path-multiplexing, channel establishment in accordance with the detected error.

Therefore, a main advantage of the present invention is in that, when a reception error generates in a user already performing communication in a slot in which multiplexing is to be newly performed, allocation of a new channel is rejected, so that precision of determining whether path multiplexing is proper or not is improved and predetermined communication quality between a radio base station and a mobile terminal device can be guaranteed.

BEST MODE FOR CARRYING OUT THE INVENTION

Figure 1:
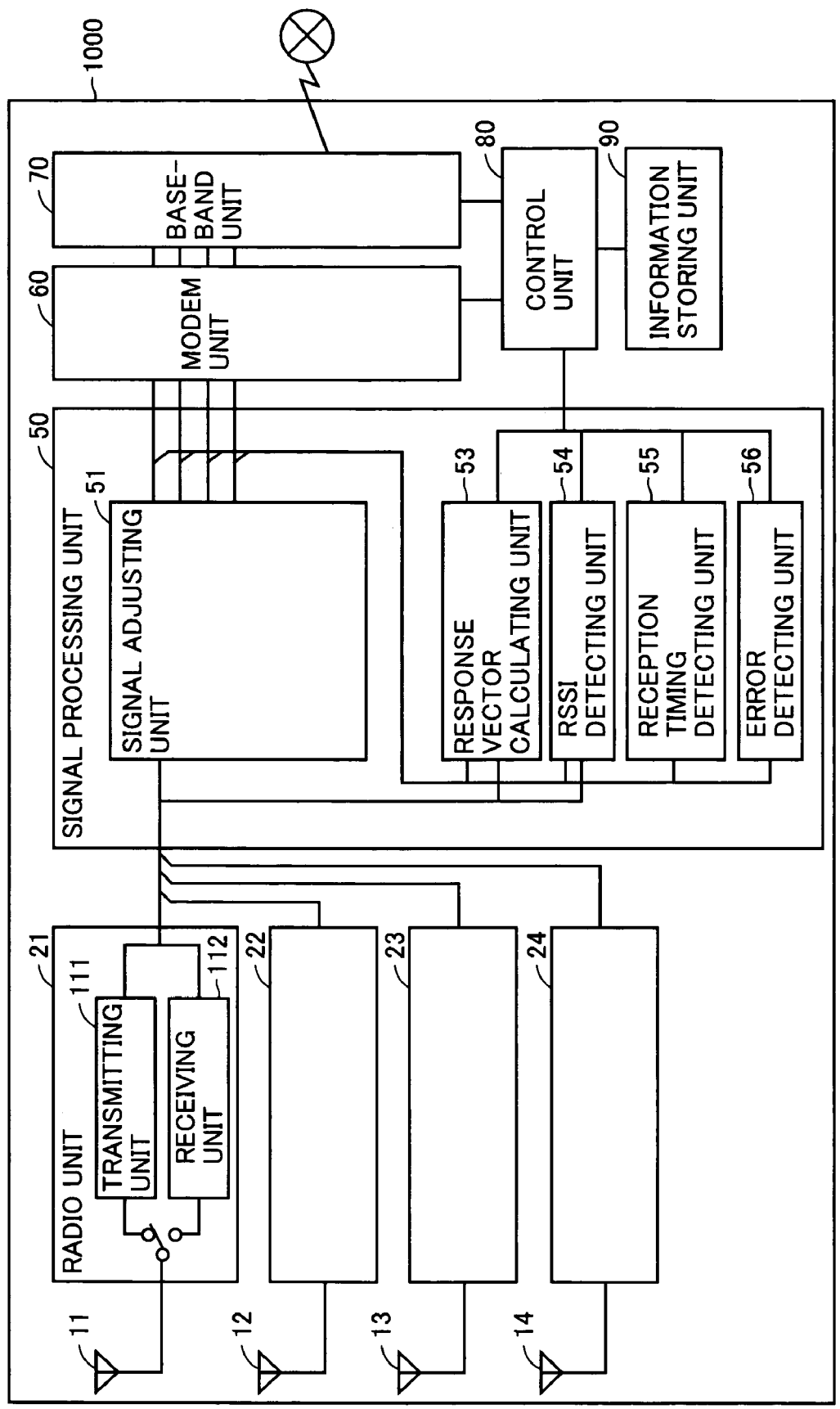
FIG. 1 is a schematic block diagram for describing the configuration of a radio base system 1000 according to the present invention.

FIG. 1 is a schematic block diagram for describing the configuration of a radio base system 1000 according to the present invention.

Radio base system 1000 is connected to a mobile terminal device (hereinafter, referred to as a mobile station) through radio waves by time division multiple access (TDMA/TDD) defined in the PHS standard and performs communication with the mobile station by the above-described time division multiplexing and, in addition, path multiplexing.

[Configuration of Radio Base System 1000]

Radio base system 1000 is constructed by, as shown in FIG. 1, antenna units 11 to 14, wireless units 21 to 24, a signal processing unit 50, a modem unit 60, a base-band unit 70, a control unit 80 and an information storing unit 90. The configuration of each of the units will now be described in more detail below.

(1) Base-Band Unit 70

Base-band unit 70 is connected to an exchange via an ISDN line.

Base-band unit 70 receives packet data via the ISDN line, extracts traffic information from the received packet data, performs a TDMA modulating process and a path multiplexing process, splits the extracted traffic information to a plurality of base-band signals via a plurality of channels, and outputs the base-band signals to modem unit 60.

In the TDMA modulating process, four channels are time-division multiplexed in one TDMA/TDD frame in accordance with the PHS standard. The TDMA/TDD frame is constructed by four transmission time slots and four reception time slots. A set of one transmission time slot and one reception time slot constructs one channel by time-division multiplexing. Further, by the path multiplexing process as described above spatially multiplexes four channels at the maximum in each time slot set. Therefore, by the TDMA modulating process and the path multiplexing process, 16 channels are multiplexed at the maximum in one TDMA/TDD frame.

Base-band unit 70 receives a plurality of base-band signals from modem unit 60 via maximum 16 channels in one TDMA/TDD frame, generates packet data from the base-band signals, and outputs the packet data via the ISDN line.

(2) Modem Unit 60

Modem unit 60 receives a signal modulated by π/4 shift QPSK from signal processing unit 50, demodulates the modulated base-band signal, and outputs the generated base-band signal to base-band unit 70.

Modem unit 60 receives the base-band signal from base-band unit 70, modulates the received base-band signal by π/4 shift QPSK, and outputs the modulated signal to signal processing unit 50.

Modem unit 60 performs modulating and demodulating operations as described above in parallel on maximum four TDMA/TDD frames which are spatially multiplexed in one time division channel.

(3) Information Storing Unit 90

Information storing unit 90 stores a threshold value for a reception error which will be described later.

(4) Signal Processing Unit 50

Signal processing unit 50 is constructed by a signal adjusting unit 51, a response vector calculating unit 53, an RSSI detecting unit 54 and a reception timing detecting unit 55 and, specifically, is realized by a programmable digital single processor (hereinafter, abbreviated as DSP).

(Signal Adjusting Unit 51)

Signal adjusting unit 51 receives signals from radio units 21 to 24. With respect to a part where the contents of a received signal is preliminarily known in four reception time slots in each TDMA/TDD frame, signal adjusting unit 51 calculates a weight factor for each mobile station so that the error between the signal and a reference signal becomes the minimum, adjusts the amplitude and the phase of each of signals received from the radio units 21 to 24 in accordance with the calculated weight factor for each mobile station, and adds the resultants.

By the operation, signals for respective mobile station are separated from the spatially multiplexed signals received from radio units 21 to 24 and are outputted to modem unit 60.

A signal obtained by multiplying the signal received on the mobile station unit basis from modem unit 60 with the above-described weight factor for each antenna is outputted to radio units 21 to 24.

In such a manner, a directivity pattern is formed so that a signal is transmitted only to a desired mobile station. That is, signal adjusting unit 51 performs the process of an adaptive array device as described above.

(RSSI Detecting Unit 54)

RSSI detecting unit 54 detects field intensity of a mobile station received by radio units 21 to 24 in each of time slots in each TDMA/TDD frame on the time slot unit basis and writes the field intensity of the mobile station to which a communication channel is already allocated and which performs communication into information storing unit 90. RSSI detecting unit 54 outputs the detected field intensity of a mobile station newly requesting allocation of a communication channel to control unit 80.

Although not particularly limited, for example, it is assumed that RSSI detecting unit 54 detects field intensity when allocation of a communication channel is requested from a mobile station.

(Response Vector Calculating Unit 53)

For each of time slots in each TDMA/TDD frame, response vector calculating unit 53 calculates a response vector including direction information of a mobile station performing communication in the time slot on the basis of the signals received from radio units 21 to 24 and the signal adjusted by signal adjusting unit 51.

A response vector will be briefly described. In the following, to make description simpler, the number of users performing communication simultaneously by using four antenna devices is set to two. Signals received from the antennas are expressed by the following equations:

$$RX_1(t)=h_{11}Srx_1(t)+h_{12}Srx_2(t)+n_1(t) \quad (1)$$

$$RX_2(t)=h_{21}Srx_1(t)+h_{22}Srx_2(t)+n_2(t) \quad (2)$$

$$RX_3(t)=h_{31}Srx_1(t)+h_{32}Srx_2(t)+n_3(t) \quad (3)$$

$$RX_4(t)=h_{41}Srx_1(t)+h_{42}Srx_2(t)+n_4(t) \quad (4)$$

wherein signal $RX_j(t)$ indicates a reception signal of a j-th antenna (j=1, 2, 3, 4), and signal $Srx_i(t)$ denotes a signal transmitted from the i-th user (i=1, 2).

Further, the coefficient $h_{ji}$ indicates a complex coefficient of a signal from the i-th user, which is received by the j-th antenna, and $n_j(t)$ denotes noise included in the j-th reception signal.

The above equations (1) to (4) are expressed in vector formats as follows:

$$X(t)=H_1Srx_1(t)+H_2Srx_2(t)+N(t) \quad (5)$$

$$X(t)=[RX_1(t), RX_2(t), \ldots, RX_n(t)]^T \quad (6)$$

$$H_i=[h_{1i}, h_{2i}, \ldots, h_{ni}]^T, (i=1, 2) \quad (7)$$

$$N(t)=[n_1(t), n_2(t), \ldots, n_n(t)]^T \quad (8)$$

In the equations (6) to (8), $[\ldots]^T$ denotes translocation of $[\ldots]$.

X(t) indicates an input signal vector, $H_i$ indicates a reception response vector of the i-th user, and N(t) expresses a noise vector.

When the adaptive array is properly controlled, a signal $Srx_1(t)$ sent from the first user out of two users is obtained.

In other words, when the adaptive array is controlled so that signal $Srx_1(t)$ sent from the first user is obtained, in theory, by calculating correlation between input signal vector X(t) and signal $Srx_1(t)$, reception response vector $H_1$ of the first user can be obtained by the equation (5). A similar result is obtained also in the case of the second user.

Response vector calculating unit 53 writes the response vector calculated with respect to a mobile station to which a communication channel has been already allocated and which is performing communication into information storing unit 90. A response vector calculated also with respect to a mobile station newly requesting allocation of a communication channel is outputted to control unit 80.

(Reception Timing Detecting Unit 55)

Reception timing detecting unit 55 obtains signals separated for each mobile station from signal adjusting unit 51 on the unit basis of a time slot in each TDMA/TDD frame, and measures time at which a unique word signal (UW signal) is received in a mobile station communicating in the time slot by using the start point of the time slot as a reference.

Reception timing detecting unit 55 uses, as a reception timing of each mobile station, the start time of a period determined that the UW signal is received by using the start point of the time slot as a reference. Reception timing detecting unit 55 writes a measured reception timing of a mobile station to which a communication channel has been already allocated and which is performing communication into information storing unit 90. Reception timing detecting unit 55 outputs a measured reception timing of a mobile station newly requesting allocation of a communication channel to control unit 80.

(Error Detecting Unit 56)

Error detecting unit 56 detects an error in a reception signal as will be described later and gives it to control unit 80. Control unit 80 compares the error information from error detecting unit 56 with a threshold stored in information storing unit 90 and determines whether new channel allocation is performed or not.

(5) Control Unit 80

Control unit 80 is constructed by, specifically, a microprocessor, a ROM in which a computer program is recorded, a RAM used for work, and the like. When the microprocessor executes the program recorded in the ROM, the function of control unit 80 is achieved.

Figure 2:
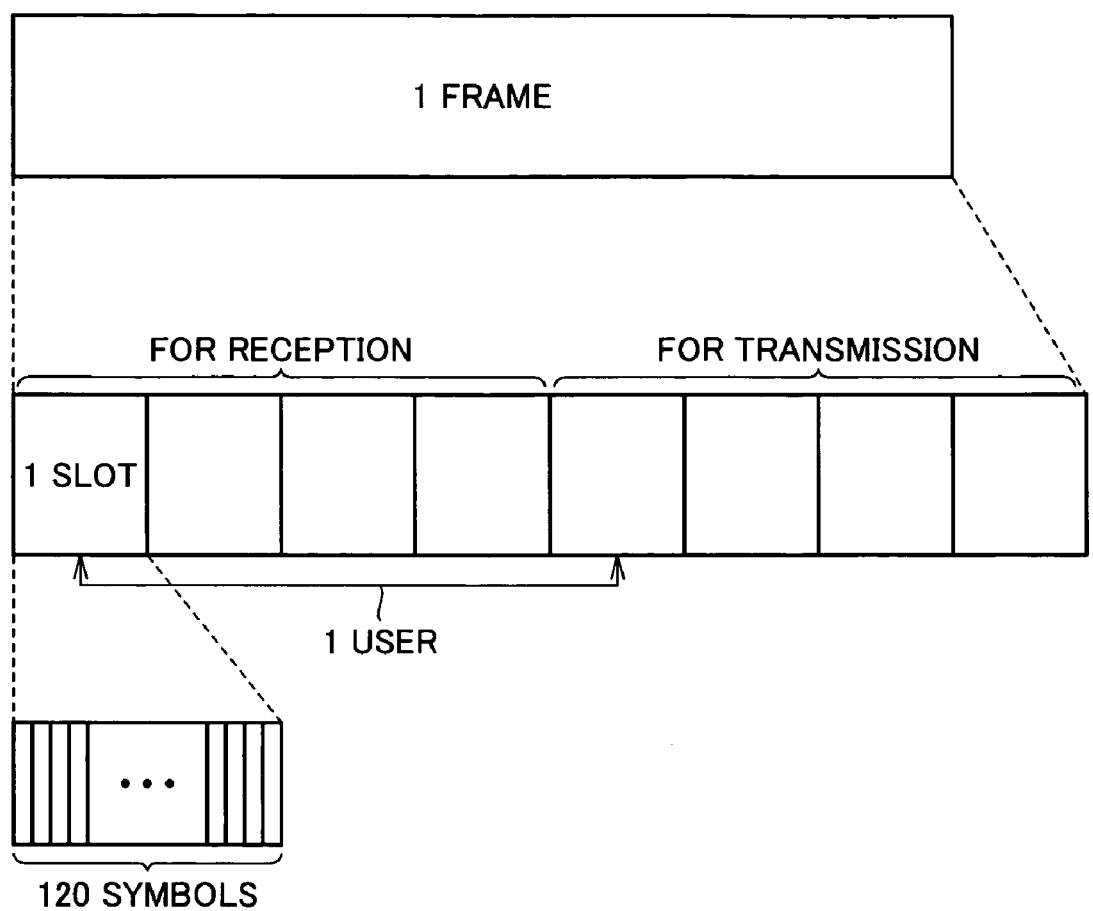
FIG. 2 is a conceptual diagram for describing the configuration of a signal transmitted/received between a mobile terminal device and PDMA radio base system 1000 in the present invention.

FIG. 2 is a conceptual diagram for describing the structure of a signal transmitted/received between a mobile terminal device and PDMA radio base system 1000 in the present invention.

A signal of one frame is divided into eight slots. For example, four slots in the first half are used for reception and four slots in the latter half are used for transmission.

Each slot is formed of 120 symbols. In the example shown in FIG. 2, one slot for reception and one slot for transmission are used as a set. The signal of one frame is allocated to four users at the maximum.

It is assumed that each frame includes a unique word signal (reference signal) section and a cyclic redundancy check (CRC) can be made.

It is further assumed that, in the case where mobile terminal devices of a plurality of users are multi-path connected to the same time slot, to identify each user by deviating reception timings of reception signals from the mobile terminal devices, transmission timings from base station 1000 to the terminals are deviated from a reference transmission timing.

In PHS, a reception signal from each mobile terminal device includes the reference signal (unique word (UW) signal) section which is constructed by a known bit train which is common to all of the users in every frame. When sync positions of reception signals from mobile terminal devices of a plurality of users coincide with each other in accordance with states of transmission paths, the reference signal sections in the reception signals are overlapped with each other, the users cannot be identified separately, and interference (so-called swap) among users is caused.

(Operation of Error Detecting Unit 56)

As described with reference to FIG. 2, in the case where mobile terminal devices of a plurality of users are multi-path connected to the same time slot, in order to identify each user, reception timings of reception signals from the mobile terminal devices are deviated by, for example, time Δt during normal reception.

Figure 3:
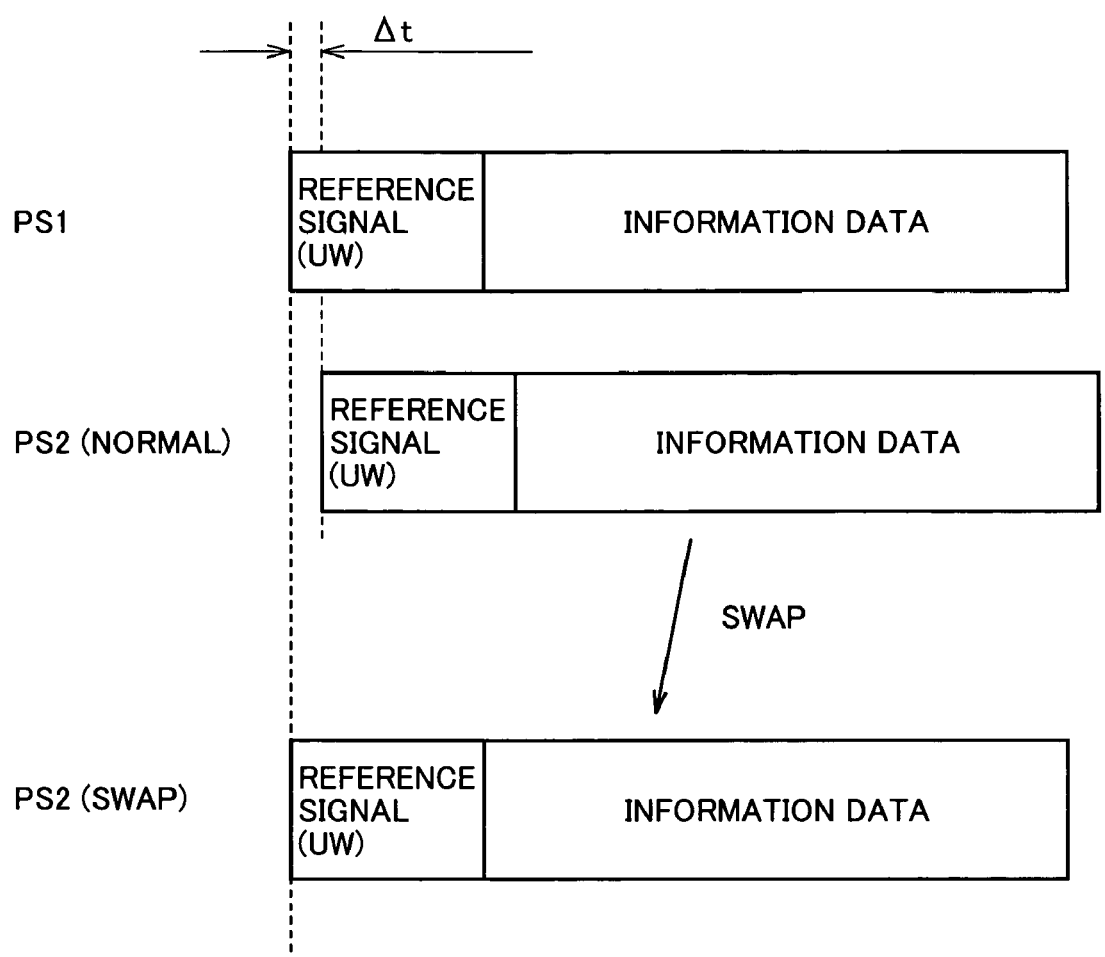
FIG. 3 is a conceptual diagram showing reception timings of signals PS1 and PS2.

FIG. 3 is a conceptual diagram showing reception timings of signals PS1 and PS2 from two users.

As shown in FIG. 3, for example, when a swap is caused due to interruption of a user, terminal PS2 erroneously recognizes that a signal for terminal PS1 is a signal for itself, so that terminal PS2 transmits an up-link signal at a timing at which terminal PS1 is to transmit a signal. Consequently, there is no deviation between reception timings of reception signals from terminals PS1 and PS2.

In a state where such a swap is caused, it is seen from base station 1000 that user PS2 is disappeared, so that a reference signal error (UW error) generates with respect to user PS2.

On the other hand, in interrupted user PS1, the unique word signal coincides with both signals PS1 and PS2, so that an UW error does not generate. However, information data (sound signal or the like) of signal PS1 and that of signal PS2 are different from each other, so that a reception error (CRC error) frequently generates with respect to the signal of user PS1.

In addition to such swap, when communication quality of a transmission path deteriorates, the CRC error frequently generates.

Error detecting unit 56 detects such an error, thereby providing information indicating that directivity control of the adaptive array is insufficient and interference removing capability deteriorates.

Error detecting unit 56 counts the number of errors in a frame of a reception signal (FER: Frame Error Rate) on the basis of detection of the CRC error.

[Processes on Establishment of Link Channel]

On reception of a link channel establishment request or a link channel establishment re-request from a mobile station, control unit 80 performs processes on establishment of a link channel as follows.

Control unit 80 sequentially checks time slots of a TDMA/TDD frame. When there is no other mobile station which is performing communication in a time slot, control unit 80 allocates a communication channel in the time slot.

When another mobile station is performing communication, control unit 80 performs the following multiplexing determining process. In the case where multiplexing is determined by the process, a communication channel in path multiplexing is allocated in the time slot.

On the other hand, when it is determined that multiplexing is impossible, determination is repeated in other time slots. When it is determined in all of time slots that multiplexing is impossible, control unit 80 rejects allocation of a communication channel.

(Multiplexing Determining Process)

By the multiplexing determining process, control unit 80 determines whether path multiplexing can be performed or not between a mobile station to which a communication channel is to be newly allocated in a time slot and a mobile station to which a communication channel is already allocated and which is performing communication as follows.

First, control unit 80 receives a response vector of a mobile station to which a communication channel is to be newly allocated from response vector calculating unit 53 and reads out a response vector of a mobile station to which a communication channel is already allocated and which is performing communication from information storing unit 90. Control unit 80 calculates a correlation value of response vectors of two mobile stations in such a manner.

Further, control unit 80 receives field intensity of a mobile station to which a communication channel is to be newly allocated from RSSI detecting unit 54 and reads out field intensity of a mobile station to which a communication channel has been already allocated and which is performing communication from information storing unit 90. In such a manner, control unit 80 calculates a field intensity ratio between the two mobile stations.

Alternately, control unit 80 may receive a reception timing of a mobile station to which a communication channel is to be allocated from reception timing detecting unit 55, receive a reception timing of an existing mobile station from information storing unit 90, and determine whether or not path multiplexing is performed on the basis of the difference between the reception timings.

In addition to response vector calculation, reception timing detection, and field intensity measurement for determining the possibility of path multiplexing, in the present invention, whether a new channel is allocated or not is determined on the basis of an error generation state as described below.

[Operation of Radio Base System 1000]

Figure 4:
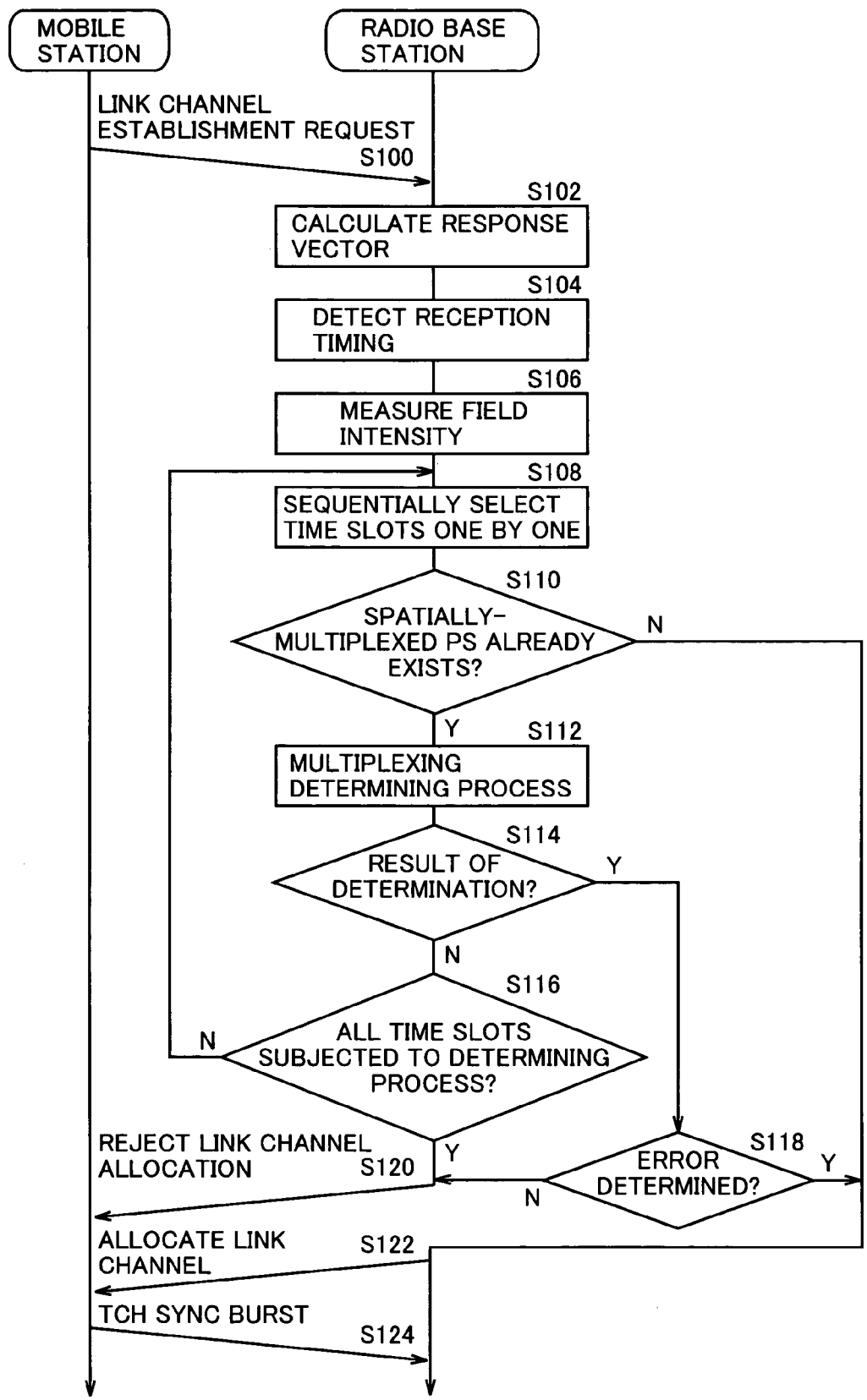
FIG. 4 is a flowchart showing operations performed at the time of establishing a link channel.

FIG. 4 is a flowchart showing operations on establishment of a link channel.

When radio base system 1000 receives a link channel establishment request or a link channel establishment re-request from a mobile station (step S100), response vector calculating unit 53 calculates a response vector (step S102), reception timing detecting unit 55 detects a reception timing (step S104), and RSSI detecting unit 54 measures field intensity (step S106).

Control unit 80 sequentially selects time slots of a TDMA/TDD frame one by one (step S108) and determines whether a mobile station already performing communication exists in the time slot or not (step S100).

When a mobile station performing communication does not exist, control unit 80 allocates a communication channel to a mobile station requesting a communication channel (step S102).

When a mobile station already performing communication exists, control unit 80 performs the multiplexing determining process (step S102). In the multiplexing determining process, control unit 80 determines whether path multiplexing is proper or not by comparing any of the correlation value of a response vector of a new mobile terminal device and a response vector of a mobile terminal device which is already performing communication, the difference between a reception timing of a new mobile terminal device and a reception timing of a mobile terminal device which is already performing communication, and the ratio between field intensity of a signal received from the new mobile terminal device and field intensity of a signal received from the mobile terminal device already performing communication with a corresponding threshold value.

In the case where it is determined in the process of step S102 that multiplexing is possible (step S104), whether channel allocation is permitted or not is further determined on the basis of a result of error detection of error detecting unit 56 (step S108). As a result of an error check, when it is determined that channel allocation is possible, a communication channel is allocated by path multiplexing to the mobile station which has requested a communication channel (step S102).

On the other hand, when it is determined in step S104 that multiplexing is impossible, the processes are repeated on the other time slots (step S106). In the case where it is determined that multiplexing is impossible in all of time slots or it is determined as a result of the error check in step S108 that allocation is impossible, allocation of a communication channel is rejected (step S100).

Figure 5:
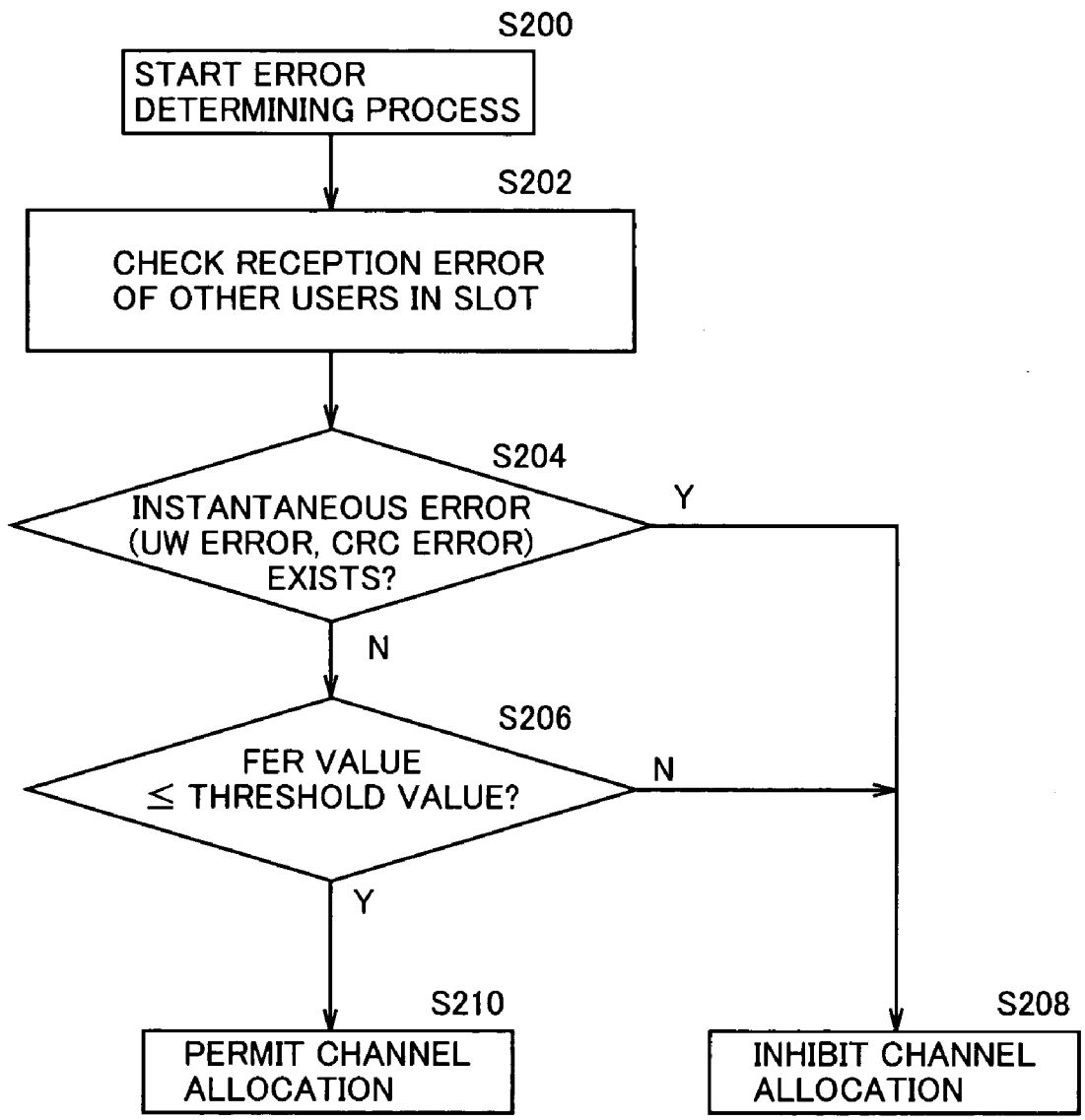
FIG. 5 is a flowchart for describing an error determining process shown in FIG. 4.
Figure 6:
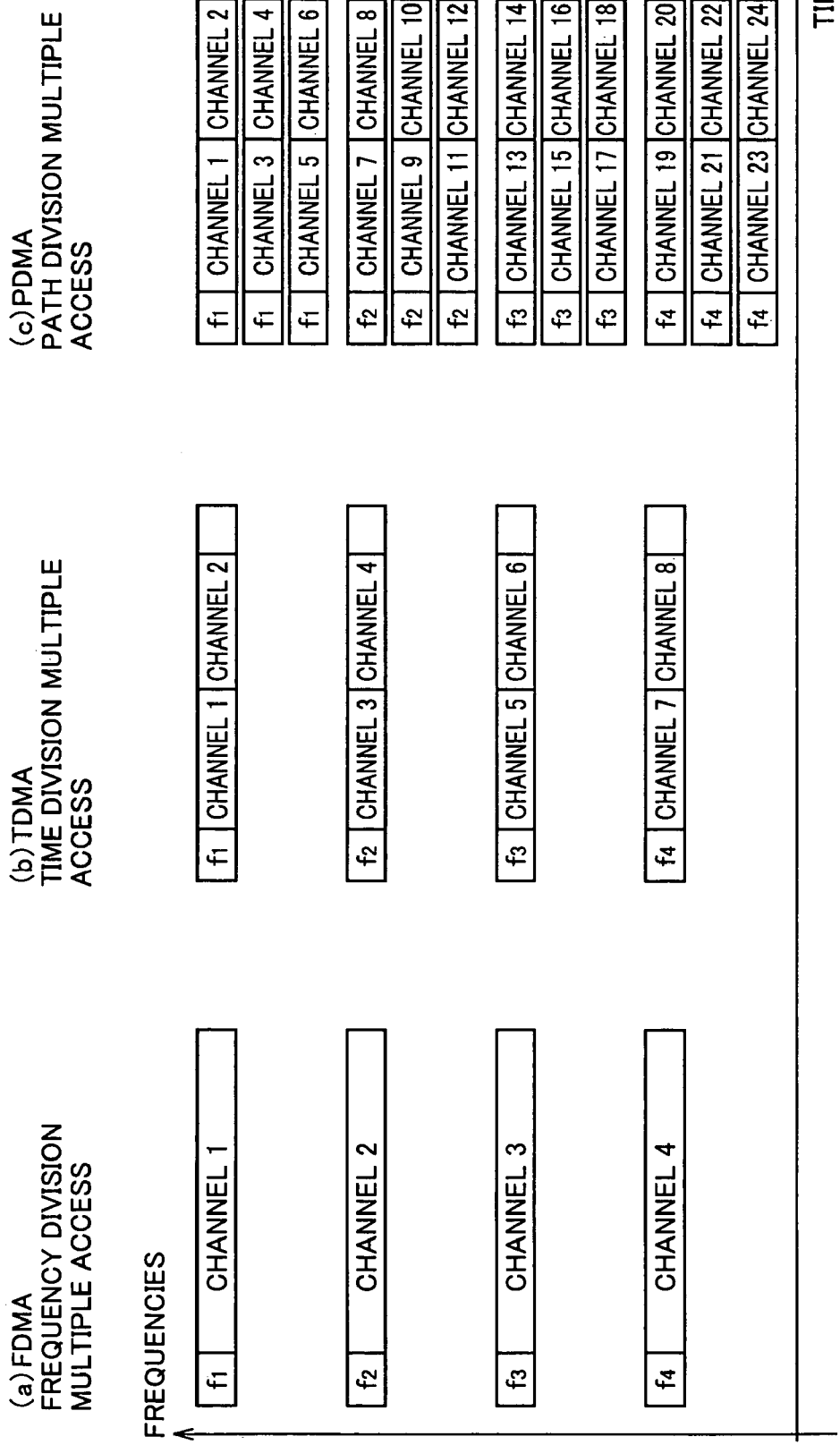
FIG. 6 is a channel allocation diagram in various communication systems of frequency division multiple access, time division multiple access and path division multiple access.

FIG. 5 is a flowchart for describing the error determining process in step S108 shown in FIG. 4.

When the error determining process is started by new connection or the like (step S200), a check is made to see whether or not a reception error generates in another user already performing communication in the slot in which multiplexing is to be newly carried out (step S202).

Subsequently, whether an instantaneous error (UW error or CRC error) exists in another user or not is determined (step S204). If an instantaneous error exists, channel allocation is inhibited (step S208).

On the other hand, when an instantaneous error does not exist, whether the value of a frame error rate (FER) is equal to or lower than a threshold value is determined (step S206). When the frame error rate value is not equal to or lower than the threshold value, channel allocation is inhibited (step S208). The threshold of the frame error rate value can be set to, although not particularly limited, for example, 20% for the following reason. Generally, when the FER becomes 20%, it is necessary to switch a communication slot. In the case of FER corresponding to the half of 20%, it cannot be said that good communication quality is maintained.

On the other hand, in the case where the value of the frame error is equal to or lower than the threshold value, channel allocation is permitted (step S210).

As described above, in the case where a reception error generates in a user already performing communication in a slot in which multiplexing is to be newly performed, it is considered that sufficient precision of a weight vector generated in the base station adaptive array process cannot be obtained. In such a case, therefore, path multiplexing is not permitted, thereby enabling stability in multi-path communication to be increased. As a result, communication characteristics are improved, the number of interference activation times decreases, and deterioration in communication quality such as swap or abnormal disconnection can be avoided.

Although the multiplexing determining process in step S102 is performed on the basis of the response vector, reception timing, or field intensity in the above description, the present invention is not limited to such a case. The present invention can be also applied to a case where a multiplexing determination is made on the basis of other criteria.

Although the present invention has been described and illustrated in detail, it is clearly understood that the same is by way of illustration and example only and is not to be taken by way of limitation, the spirit and scope of the present invention being limited only by the terms of the appended claims.

The invention claimed is:

1. A radio base system multi-path connected to a plurality of mobile terminal devices via a plurality of paths being multiplexed to each of a plurality of slots being multiplexed in a time division manner, to transmit/receive signals, comprising:

signal adjusting unit for performing an adaptive array process for performing multi-path connection to said plurality of mobile terminal devices;

error detecting unit for detecting an error in a signal from the mobile terminal device connected to each of said plurality of slots; and control unit for, when a communication channel establishment request is sent from one of said plurality of mobile terminal devices, selecting one of said plurality of slots to determine if there is a mobile terminal device to which a communication channel is already connected for said for selected slot, allocating a channel to said one mobile terminal device if there is no mobile terminal device to which a communication channel is already connected for said selected slot, determining if multi-path connection is appropriate for said one mobile terminal device when there is a mobile terminal device to which a communication channel is already connected, permitting, when it is determined that multi-path connection is possible, channel establishment in accordance with a result of detection of said error detecting unit, and selecting, when it is determined that multi path connection is impossible, a subsequent slot sequentially.

2. The radio base system according to claim 1, wherein
said signal includes a code for error detection, and
said error detecting unit detects an error in said signal on the basis of said error detection code.

3. The radio base system according to claim 1, wherein
said signal includes a reference signal used by said signal adjusting unit to perform said adaptive array process, and
said error detecting unit detects an error in said signal on the basis of a detection error of said reference signal.

4. The radio base system according to claim 2, wherein
said signal includes a plurality of frames each having a predetermined number of said slots, and
said error detecting unit detects an error in said signal on the basis of the number of errors based on said error detection code per said frame.

5. The radio base system according to claim 1, wherein the radio base system multi-path connects to the plurality of mobile terminal devices by spatially dividing the same time slot of the same frequency.

6. A channel allocating method in a radio base system multi-path connected to a plurality of mobile terminal devices via a plurality of paths being multiplexed to each of a plurality of slots being multiplexed in a time division manner, to transmit/receive signals, the method comprising the steps of:

detecting an error in a signal from the mobile terminal device connected to each of said plurality of slots;

when a communication channel establishment request is sent from one of said plurality of mobile terminal devices, selecting one of said plurality of slots to determine if there is a mobile terminal device to which a communication channel is already connected for said selected slot; and allocating a channel to said one mobile terminal device if there is no mobile terminal device to which a communication channel is already connected for said selected slot, determining if multi path connection is appropriate for said one mobile terminal device when there is a mobile terminal device to which a communication channel is already connected, permitting, when it is determined that multi-path connection is possible, channel establishment in accordance with said detected error, and selecting, when it is determined that multi-path connection is impossible, a subsequent slot sequentially, wherein the multi-path connection is performed by an adaptive array process.

7. The channel allocating method according to claim 6, wherein
said signal includes a code for error detection, and
said error detecting step includes the step of detecting an error in said signal on the basis of said error detection code.

8. The channel allocating method according to claim 6, wherein
said signal includes a reference signal used to perform an adaptive process for performing said path multiplexing connection to said plurality of mobile terminal devices, and
said error detecting step includes the step of detecting an error in said signal on the basis of a detection error of said reference signal.

9. The channel allocating method according to claim 7, wherein
said signal includes a plurality of frames each having a predetermined number of said slots, and
said error detecting step includes the step of detecting an error in said signal on the basis of the number of errors based on said error detection code per said frame.

10. The channel allocating method according to claim 6, wherein the radio base system multi-path connects to the plurality of mobile terminal devices by spatially dividing the same time slot of the same frequency.

* * * * *